US011183146B1

(12) United States Patent
Zhou

(10) Patent No.: US 11,183,146 B1
(45) Date of Patent: Nov. 23, 2021

(54) CURVATURE INTERPOLATION FOR LOOKUP TABLE

(71) Applicant: Apple Inc., Cupertino, CA (US)

(72) Inventor: Jian Zhou, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/003,762

(22) Filed: Aug. 26, 2020

(51) Int. Cl.
*G09G 5/06* (2006.01)
*G06T 3/40* (2006.01)
*G06T 5/00* (2006.01)
*H04N 1/60* (2006.01)

(52) U.S. Cl.
CPC .................................... *G09G 5/06* (2013.01)

(58) Field of Classification Search
CPC combination set(s) only.
See application file for complete search history.

(56) References Cited

U.S. PATENT DOCUMENTS 5,951,625 A * 9/1999 Duvanenko ............. G06F 7/544 708/290
7,940,982 B1 * 5/2011 Shaick ..................... H04N 1/46 382/162
2004/0126010 A1 * 7/2004 Yamazoe ............... H04N 1/646 382/162
2005/0213122 A1 * 9/2005 Aldrich .................. H04N 9/045 358/1.9
2012/0188265 A1 * 7/2012 Suzuki ..................... G09G 5/06 345/589
2012/0206478 A1 * 8/2012 Nakamura ............... G09G 5/06 345/589
2013/0321675 A1 * 12/2013 Cote ...................... H04N 9/646 348/242
2017/0076431 A1 * 3/2017 Dai ......................... G06T 5/009

OTHER PUBLICATIONS

Hilding Sundqvist & Geroge Veronis, A simple finite-difference grid with non-constant intervals, Aug. 5, 1969, Tellus XXII (1970), 1, Published by Taylor.
Finite difference method, Wikipedia, last revised Jul. 2, 2020.
H.B. Keller and V. Pereyra, Symbolic Generation of Finite Difference Formulas, Mathematics of Computation, vol. 32, No. 144, Oct. 1978, pp. 955-971.

* cited by examiner

*Primary Examiner* — Wesner Sajous
(74) *Attorney, Agent, or Firm* — Fletcher Yoder, P.C.

(57) ABSTRACT

An electronic device includes an electronic display configured to present an image based on image data and a display pipeline having image processing circuitry to process the image data for display on the electronic display by receiving the image data, referencing a lookup table (LUT) to determine output values based on a plurality of input value sets associated with the image data, the LUT including entries respectively mapping an output value to a defined input value set, determining whether an input value set of the plurality of input value sets is represented by the entries of the LUT, performing curvature interpolation to determine an interpolated output value associated with the input value set in response to determining the input value set of the image data is not represented by the entries of the LUT, and applying the interpolated output value to the input value set to generate updated image data.

25 Claims, 8 Drawing Sheets

CURVATURE INTERPOLATION FOR LOOKUP TABLE

BACKGROUND

The present disclosure relates to curvature interpolation to obtain data from a lookup table, such as using curvature interpolation during image data processing.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more images (e.g., image frames). For example, such electronic devices may include computers, mobile phones, portable media devices, tablets, televisions, virtual-reality headsets, and vehicle dashboards, among many others. In any case, to display an image, an electronic display may control light emission (e.g., luminance) of its display pixels based at least in part on corresponding image data.

Various image processing techniques may be used to adjust images to be displayed by an electronic device. Such techniques may include gamma correction, distortion correction, or scaling, among other adjustments, to change the corresponding image data. Some image processing techniques may involve applying a particular function to the image data depending on some criteria, such as based on a vertical and horizontal location of the image data on an electronic display. Rather than the values of the function being calculated during runtime, the values may be precalculated and stored in a lookup table (LUT) in memory. At runtime, the appropriate values of the function may be quickly retrieved from the LUT. Although an LUT that included an entry for every possible value of the function could be very precise, it may be difficult to store an LUT that includes a large number of values (e.g., such an LUT could take up a tremendous amount of memory). Instead, an LUT instead may contain fewer entries, but intermediate values may be obtained using a form of linear interpolation. While performing linear interpolation may provide sufficient precision for an LUT representing a relatively simple function, for an LUT representing a more complex function, performing linear interpolation may not obtain sufficiently precise values and/or the LUT may take up an unacceptable amount of memory to enable linear interpolation to obtain sufficiently precise values.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure provides techniques that facilitate efficiently processing data by performing curvature interpolation on lookup tables (LUTs) using curvature interpolation. For example, curvature interpolation may enable precise values to be determined from an LUT used to process image data for display on an electronic display. In some embodiments, the image processing technique may reference a look-up table (LUT) that includes multiple entries, or a list of indexed values that associates different aspects of input image data with output image data. As an example, the LUT may define an output or adjusted brightness value based on an input or current brightness level of an image pixel. As another example, the LUT may define an output color compensation value based on an input location of an image pixel. Indeed, the image processing technique may receive image data and may reference the LUT to transform (e.g., correct) the received image data in order to generate transformed image data. The transformed image data may then be used for presentation on the electronic device (e.g., on a display of the electronic device).

However, the LUT may define a finite number of entries in order to reduce a storage size of the LUT. In other words, the LUT may not define an output value for certain sets or groupings of possible input values. Thus, curvature interpolation may be used to derive or interpolate an output value for input value sets that are not defined by the entries of the LUT. For example, curvature interpolation may derive an interpolated output value associated with a virtual entry that is positioned or located between existing entries of the LUT. The virtual entry may represent an input value set that is not defined by an existing entry of the LUT. In some embodiments, curvature interpolation may use adjacent entries (e.g., a mathematical relationship between adjacent entries) in order to determine the interpolated output value. In this manner, curvature interpolation may enable storage of a smaller sized LUT (e.g., having a limited number of entries) to limit resource consumption, while also enabling the image to be accurately transformed based on the entries of the LUT. As such, curvature interpolation further improves the transformation, such as a desired quality, of an image to be displayed by the electronic device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
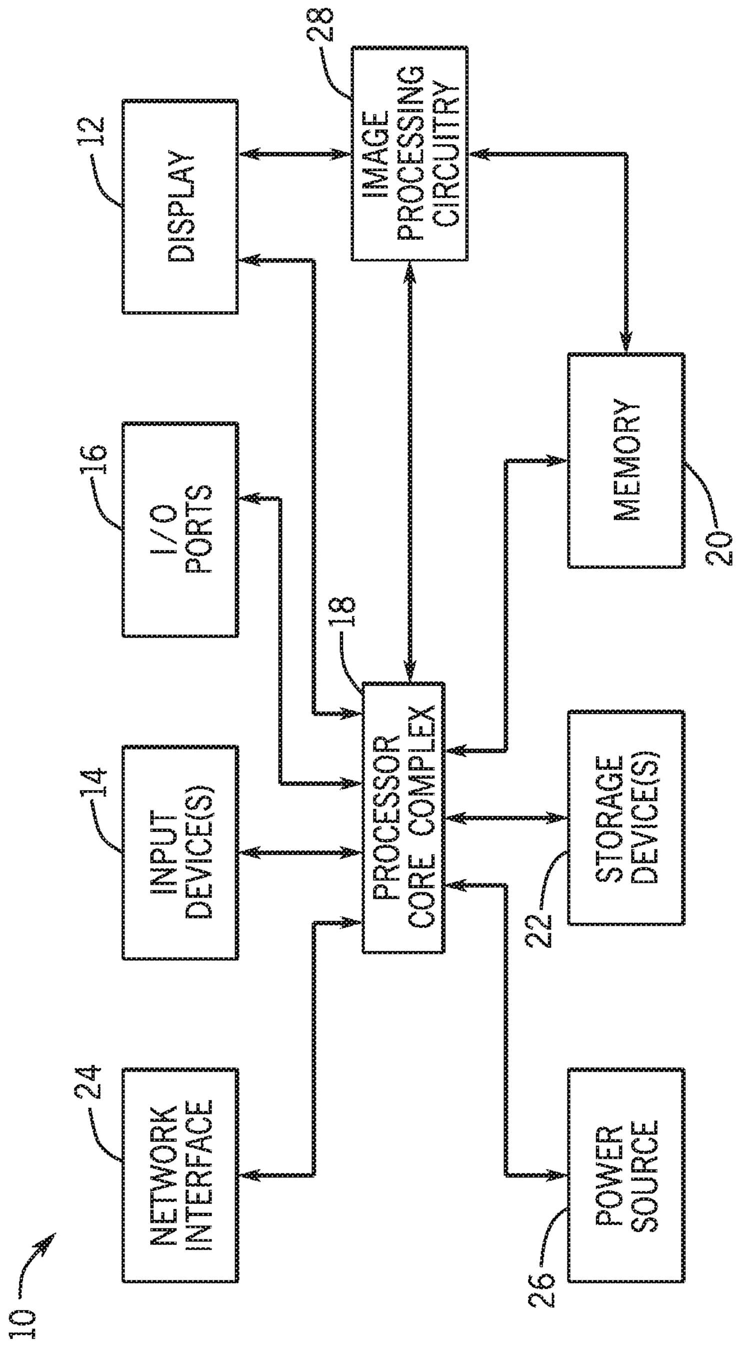
FIG. 1 is a block diagram of an electronic device with an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Many electronic devices include a processor that renders image frames by generating corresponding image data, which may be stored in memory. A display pipeline may retrieve and processes the image data before the image data is used to display the image frame on an electronic display. Such image processing may include using a lookup table (LUT) with various entries. Each entry may map or associate an output value (e.g., a corrected value, a compensation value) with one or more input values (e.g., a defined input value set). For example, based on an input value set of the image data, the display pipeline may refer to an entry of the LUT corresponding to the input value set. The display pipeline may then determine an output value associated with the referenced entry of the LUT and may apply the output value to the image data to correct a portion of the image data.

In some embodiments, the LUT may store a limited number of entries in order to reduce a storage size of the LUT. That is, the LUT may not map all possible input values or input value sets with a corresponding output value. As a result, for a particular input value or a particular input value set of a received image data, the display pipeline may not be able to refer to an existing entry of the LUT to determine the corresponding output value to apply to the image data.

Accordingly, the present disclosure provides techniques for determining an interpolated output value that is not mapped by an existing entry in the LUT. In some embodiments, curvature interpolation may be used to derive the interpolated output value. For example, an input value set of received image data may be represented by a virtual entry in the LUT. As used herein, a virtual entry refers to an input value or input value set that does not include a corresponding output value explicitly defined by or included in an existing entry of the LUT. Performing curvature interpolation may include using the output values of certain existing entries, such as existing entries adjacent to the virtual entry, to determine the output value associated with the input value set of the received image data. For example, the relationship (e.g., a non-linear relationship) between the respective output values of the existing entries and the respective input values of the existing entries, as well as the position of the virtual entry relative to the existing entries, may be used to derive the corresponding output value. In some embodiments, multiple iterations of curvature interpolation (e.g., bicurvature interpolation, tricurvature interpolation) may be used to derive an output value, such as for an LUT in which an output value is based on multiple input variables. An LUT that indexes multiple inputs may be referred to as multi-dimensional table (e.g., a 2-D LUT, a 3-D LUT). Further, although the present disclosure primarily discusses usage of curvature interpolation for image processing, it should be noted that curvature interpolation may be used for any suitable process for data processing to obtain an output value from an input value or input value set, such as in an architectural context, in statistical analysis, and so forth.

With this in mind, an electronic device 10 including an electronic display 12 is shown in FIG. 1. The electronic device 10 may be any suitable electronic device, such as a computer, a mobile phone, a portable media device, a tablet, a television, a virtual-reality headset, a vehicle dashboard, and the like. The electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and image processing circuitry 28. The various components described in FIG. 1 may include hardware elements (e.g., circuitry), software elements (e.g., a tangible, non-transitory computer-readable medium storing instructions), or a combination of both hardware and software elements. The various depicted components may also be combined into fewer components or separated into additional components. For example, the local memory 20 and the main memory storage device 22 may be included in a single component. Additionally, the image processing circuitry 28 (e.g., a graphics processing unit) may be included in the processor core complex 18.

The processor core complex 18 may be operably coupled with the local memory 20 and the main memory storage device 22. Thus, the processor core complex 18 may execute instructions stored in the local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the main memory storage device 22 may store data to be processed by the processor core complex 18. Thus, in some embodiments, the local memory 20 and/or the main memory storage device 22 may include one or more tangible, non-transitory, computer-readable mediums. For example, the local memory 20 may include random access memory (RAM) and the main memory storage device 22 may include read-only memory (ROM), rewritable non-volatile memory (e.g., flash memory, hard drives, optical discs), and/or the like.

The processor core complex 18 may also be operably coupled with the network interface 24. In some embodiments, the network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G, Long-Term Evolution (LTE), or 5G cellular network.

Additionally, the processor core complex 18 may be operably coupled to the power source 26. In some embodiments, the power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

The I/O ports 16 may enable the electronic device 10 to interface with other electronic devices. For example, when a portable storage device is connected, the I/O port 16 may enable the processor core complex 18 to communicate data with the portable storage device. The input device 14 may facilitate user interaction with the electronic device 10, for example, by receiving user inputs. Thus, the input device 14 may include a button, a keyboard, a mouse, a trackpad, a dial, a knob, gesture-recognition features, another other suitable feature, or any combination thereof. Additionally, in some embodiments, the input device 14 may include touch-sensing components in the electronic display 12. In such embodiments, the touch sensing components may receive user inputs by detecting occurrence and/or position of an object touching the surface of the electronic display 12.

The electronic display 12 may control light emission from display pixels to present visual representations of information, such as a graphical user interface (GUI) of an operating system, an application interface, a still image, or video content, by displaying frames based at least in part on corresponding image data. The electronic display 12 may display frames of image data based at least in part on image data generated by the processor core complex 18 and/or by the image processing circuitry 28. Additionally or alternatively, the electronic display 12 may display frames based at least in part on image data received via the network interface 24, an input device, and/or one of the I/O ports 16.

Figure 2:
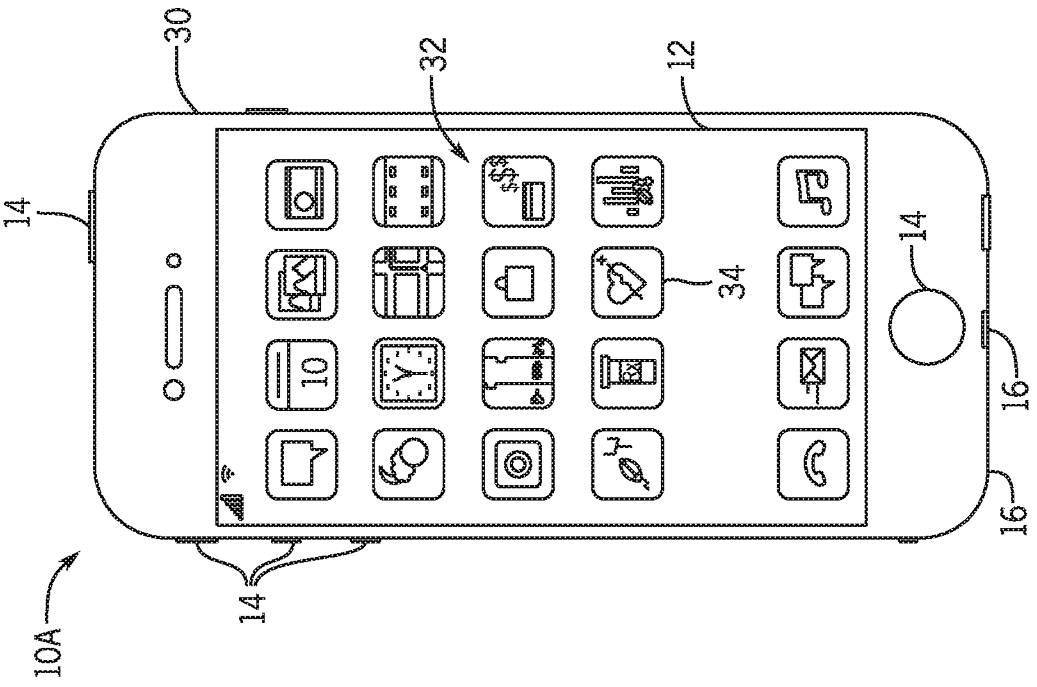
FIG. 2 is an example of the electronic device of FIG. 1 in the form of a handheld device, in accordance with an embodiment.

As described above, the electronic device 10 may be any suitable electronic device. One example of a suitable electronic device 10, specifically a handheld device 10A, is shown in FIG. 2. In some embodiments, the handheld device 10A may be a portable phone, a media player, a personal data organizer, a handheld game platform, and/or the like. As an example, the handheld device 10A may be a smart phone, such as an IPHONE® model available from Apple Inc.

The handheld device 10A may include an enclosure 30 (e.g., housing). In some embodiments, the enclosure 30 may protect interior components from physical damage and/or shield them from electromagnetic interference. Additionally, the enclosure 30 may surround the electronic display 12. The electronic display 12 may display a graphical user interface (GUI) 32 having an array of icons. By way of example, when an icon 34 is selected either by the input device 14 and/or a touch-sensing component of the electronic display 12, an application program associated with the icon 34 may launch.

Furthermore, input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 may also be accessed through openings in the enclosure 30. In some embodiments, the I/O ports 16 may include, for example, an audio jack to connect to external devices.

Figure 3:
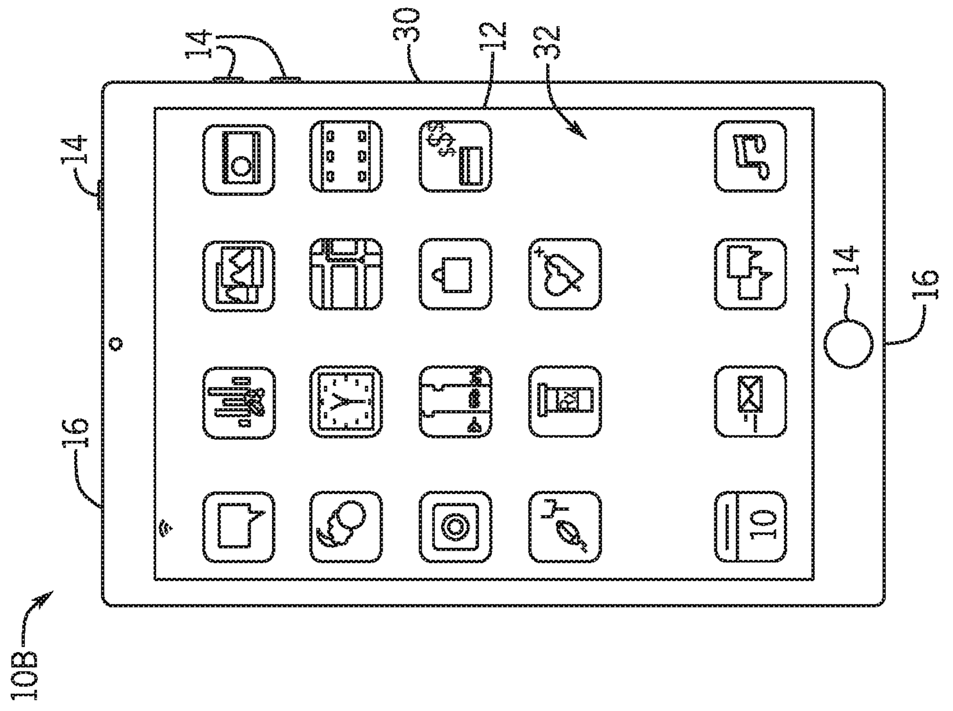
FIG. 3 is another example of the electronic device of FIG. 1 in the form of a tablet device, in accordance with an embodiment.
Figure 4:
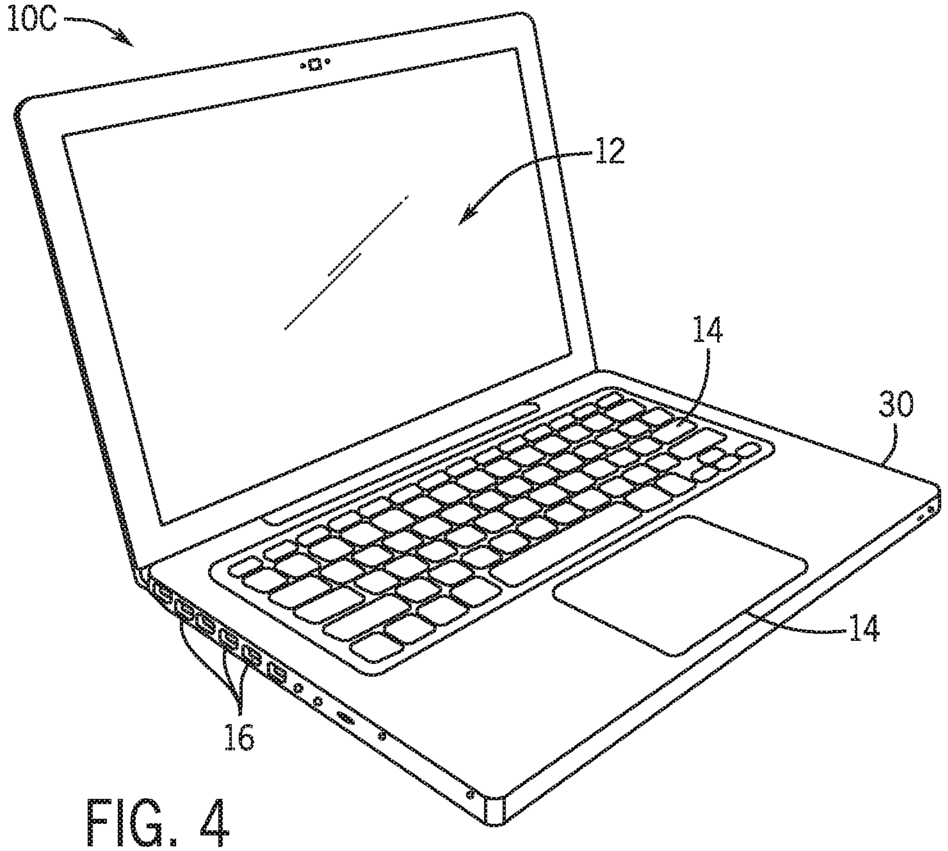
FIG. 4 is another example of the electronic device of FIG. 1 in the form of a computer, in accordance with an embodiment.
Figure 5:
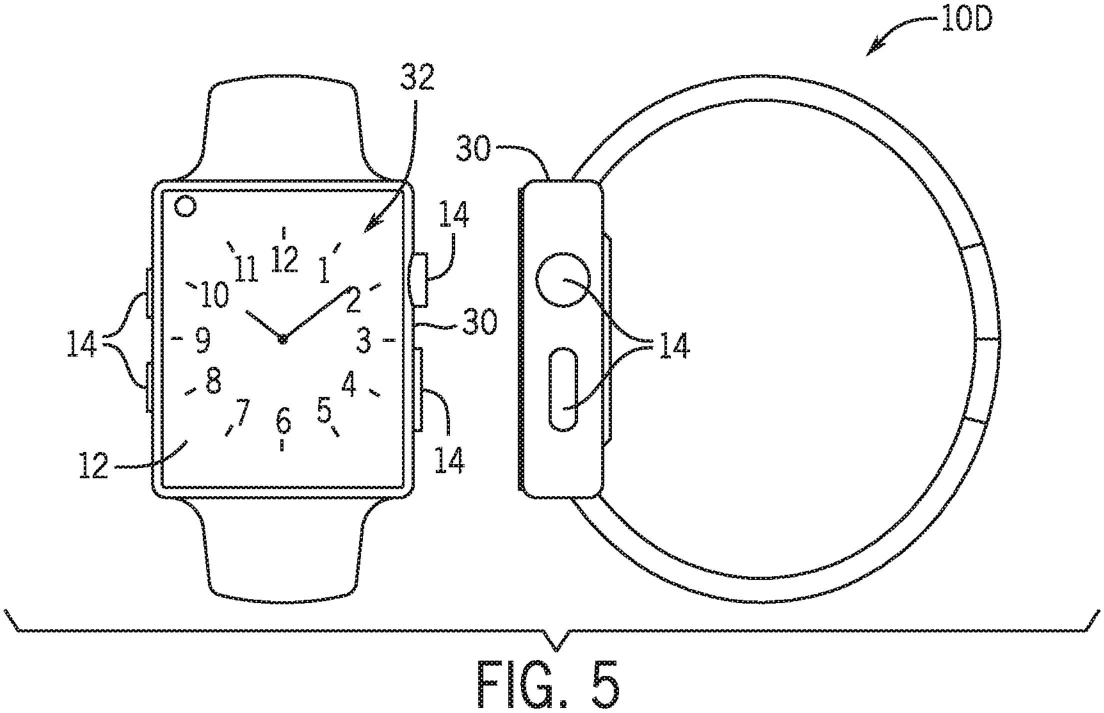
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. The computer 10C may be any MACBOOK® or IMAC® model available from Apple Inc. Another example of a suitable electronic device 10, specifically a watch 10D, is shown in FIG. 5. The watch 10D may be any APPLE WATCH® model available from Apple Inc. Each of the tablet device 10B, the computer 10C, and the watch 10D may also include a respective electronic display 12, respective input devices 14, respective I/O ports 16, and a respective enclosure 30.

In any case, as described above, processing image data may improve an image to be displayed by an electronic device. As a result, processing the image data may improve a user interaction or experience with the electronic device 10, such as by enabling the user to view an image more clearly. For example, the image processing circuitry 28 may reference an LUT and perform curvature interpolation based on entries in the LUT in order to determine an interpolation value for use in processed image data. The processed image data may then be used to display a corresponding image on the electronic display 12.

Figure 6:
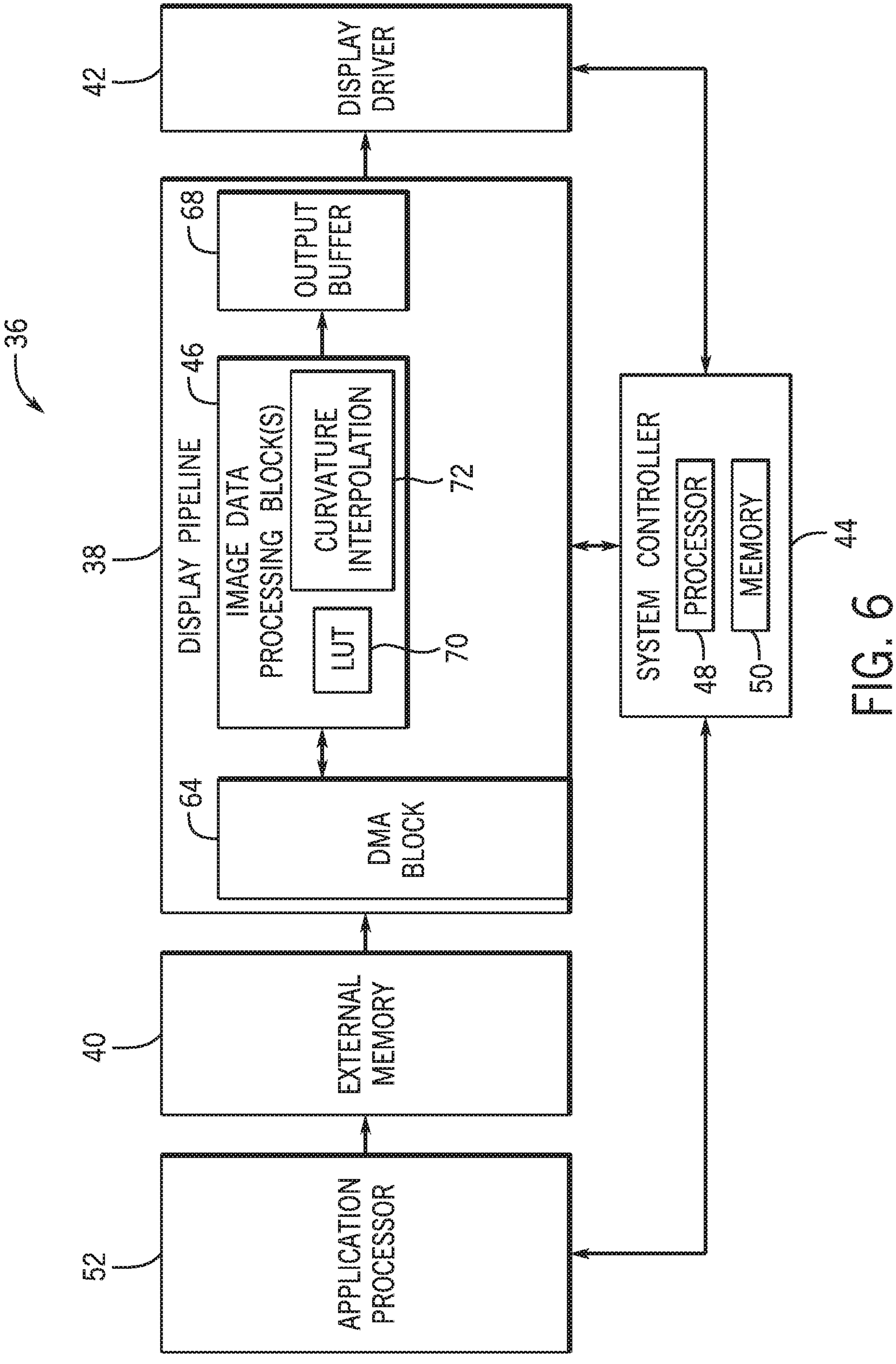
FIG. 6 is a schematic diagram of a portion of the electronic device of FIG. 1 including an application processor and a display pipeline, in accordance with an embodiment.

FIG. 6 is a schematic diagram of an image processing system 36 (e.g., that employs the image processing circuitry 28) that includes a display pipeline 38 and that may be implemented in an electronic device 10. The image processing system 36 also includes an external memory 40 (e.g., the local memory 20), a display driver 42, and a system controller 44, any of which may be implemented in an electronic display 12. In some embodiments, the system controller 44 may control operations of the display pipeline 38, the external memory 40, the display driver 42, and/or other portions of the electronic device 10. It is noted that the display pipeline 38 may include control circuitry, such as control circuitry similar to the system controller 44, but particular to management of communication between components of the display pipeline 38 (e.g., between image processing and/or configuration blocks).

To facilitate the controlling operation, the system controller 44 may include a controller processor 48 and controller memory 50. In some embodiments, the controller processor 48 may execute instructions stored in the controller memory 50. Thus, in some embodiments, the controller processor 48 may be included in the processor core complex 18, the image processing circuitry 28, a timing controller (TCON) in the electronic display 12, a separate processing module, or any combination thereof. Additionally, in some embodiments, the controller memory 50 may be included in the local memory 20, the main memory storage device 22, the external memory 40, an internal memory of the display pipeline 38, a separate tangible, non-transitory, computer readable medium, or any combination thereof. Although depicted as a system controller 44, in some embodiments, one or more separate system controllers 44 may be implemented to control operation of the electronic device 10.

In any case, the display pipeline 38 may operate to process image data retrieved (e.g., fetched) from the external memory 40, for example, to facilitate improving perceived image quality through the processing. An application processor 52 generates the image data and may store the image data in the external memory 40 for access by the display pipeline 38. In some embodiments, the display pipeline 38 may be implemented via circuitry, for example, packaged as a system-on-chip (SoC). Additionally or alternatively, the display pipeline 38 may be included in the processor core complex 18, the image processing circuitry 28, the TCON in the electronic display 12, another processing unit, other processing circuitry, or any combination thereof.

The display pipeline 38 may include a direct memory access (DMA) block 64, a configuration buffer 66, an output buffer 68, and one or more image data processing blocks 46 (e.g., an LUT 70, a curvature interpolation block 72). The various blocks of the display pipeline 38 may be implemented using circuitry and/or programmable instructions executed by a processor. The display pipeline 38 may operate to retrieve image data from the external memory 40 and, upon retrieving the image data, the display pipeline 38 may process the image data before transmission to the display driver 42. The curvature interpolation block 72 may refer to the LUT 70 to process the image data, such as to perform various transformations and/or adjustments, to enhance or improve the retrieved image data to be more suitable for presentation according to current operating and/or environmental conditions. For instance, such processing may improve a brightness level, an image geometry (e.g., a symmetry), an image scaling, and/or another appearance of the image. Indeed, the image data processing block(s) 46 may perform any suitable operation to adjust the image data received by the display pipeline 38 to be suitable for presenting an image.

By way of example, color values of images to be represented by the image data may be mapped to image reproduction configurations of an output device (e.g., the electronic display 12). That is, the image data processing block(s) 46 may transform original color values received from an image capturing device (or image source) into color values to be output (e.g., by the electronic display 12). For instance, based on input values of the retrieved image data, the image data processing block(s) 46 may refer to the entries in the LUT 70 to determine corresponding output values to be applied to the image data. Indeed, for input values explicitly defined by an existing entry in the LUT 70, the image processing block(s) 46 may use the output value associated with the existing entry. Further, for input values that are not explicitly defined by an existing entry in the LUT 70, the curvature interpolation block 72 may refer to certain existing entries (e.g., entries that are adjacent to a virtual entry representing the input values) to derive or interpolate an output value. Thus, the curvature interpolation block 72 may facilitate adjusting the image data more accurately or desirably.

Figure 7:
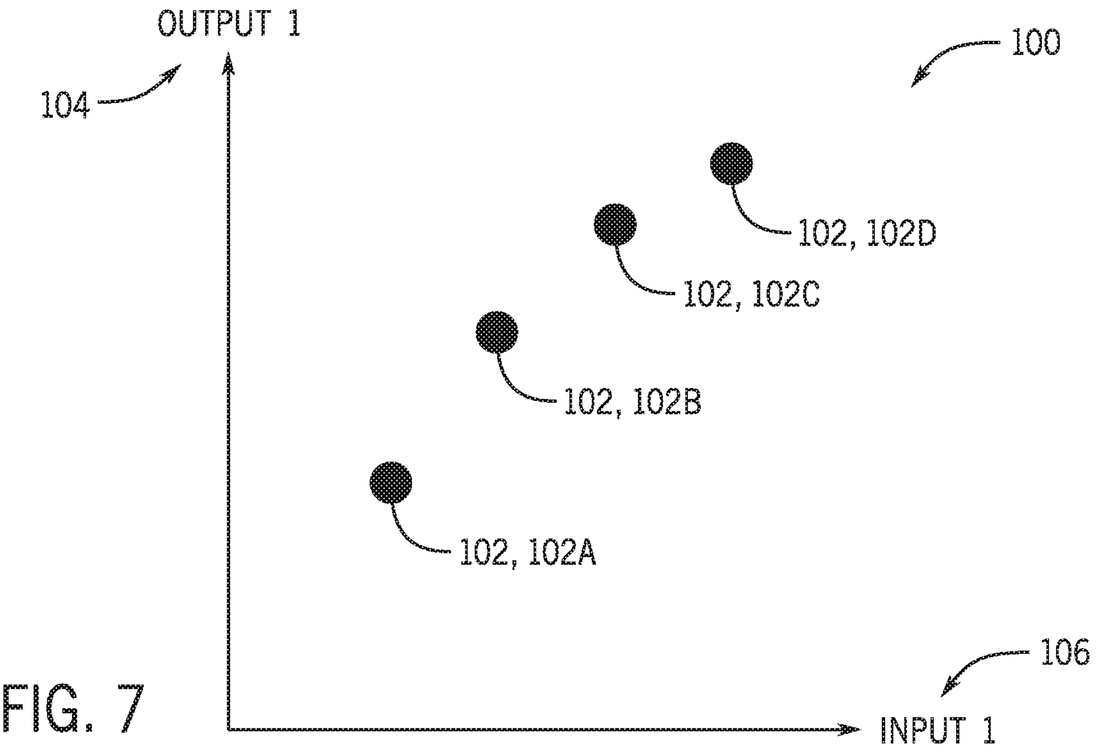
FIG. 7 is a schematic diagram of an embodiment of a one-dimensional lookup table (LUT) having various existing entries that may be referenced by an image data processing block of the display pipeline of FIG. 6 to process image data, in accordance with an embodiment.

FIG. 7 illustrates an embodiment of an LUT 100 (e.g., the LUT 70 illustrated with respect to FIG. 6) having various existing entries 102. Each existing entry 102 of the LUT 100 is illustrated as a coordinate point that is explicitly defined in the LUT 100 to map or associate a first output variable 104 with a first input variable 106 (e.g., a defined input value). In other words, the LUT 100 explicitly assigns values of the first output variable 104 with a respective value of the first input variable 106. In some embodiments, the LUT 100 may be a part of the image data processing block(s) 46 of the display pipeline 38, and the LUT 100 may be used to facilitate determining a corresponding first output variable 104 to be applied to a received image data. As an example, the image data processing block(s) 46 may determine that the image data includes a value of the first input variable 106 that matches that of one of the existing entries 102, and the image data processing block(s) 46 may refer to the LUT 100 to determine the corresponding value of the first output variable 104 of the existing entry 102 to apply to the image data. In certain embodiments, as described above the first output variable 104 may include any suitable value (e.g., a correction value, a transformation value) to be applied to the image data based on the first input variable 106, such as a color adjustment value, a geometry adjustment value, a scaling value, another suitable type of value, or any combination thereof. In any case, the image data processing block(s) 46 may determine and apply values of the first output variable 104 in order to transform (e.g., enhance the quality of) the image data.

A first existing entry 102A may include a first value of the first output variable 104 and a second value of the first input variable 106 of a first existing entry 102A. A third value of the first output variable 104 and a fourth value of the first input variable 106 of a second existing entry 102B is greater than the first value of the first output variable 104 and the second value of the first input variable 106 of the first existing entry 102A, respectively. Additionally, a fifth value of the first output variable 104 and a sixth value of the first input variable 106 of a third existing entry 102C is greater than the third value of the first output variable 104 and the fourth value of the first input variable 106 of the first existing entry 102A, respectively. Further, a seventh value of the first output variable 104 and an eighth value of the first input variable 106 of a fourth existing entry 102D is greater than the fifth value of the first output variable 104 and the sixth value of the first input variable 106 of the first existing entry 102A, respectively. Further still, as described below, the illustrated relationship between the existing entries 102 is not linear. In other words, the values of the first input variables 104 of the existing entries 102 are not proportionally related to the values of the corresponding first output variables 104 of the existing entries 102.

Since the first output variable 104 of each existing entry 102 depends on a single first input variable 106, the illustrated LUT 100 is a one-dimensional LUT. Further, although the illustrated LUT 100 includes four existing entries 102, the LUT 100 may include any suitable number of existing entries 102 that each map a first input variable 106 with a corresponding first output variable 104. For instance, the LUT 100 may include more than four existing entries 102 or fewer than four existing entries 102. Moreover, it should be noted that the respective first input variable 106 of each existing entry 102 may be evenly spaced from one another. That is, the step sizes between immediately adjacent existing entries 102 (e.g., existing entries 102 having respective values of the first input variables 106 that are incrementally different from one another) may be the same. As used herein, a step size refers to a difference between the values of the first input variables 106 of existing entries 102. Alternatively, the first input variable 106 of each existing entry 102 may be unevenly spaced from one another. In other words, the step sizes between immediately adjacent existing entries 102 may be different from one another.

Figure 8:
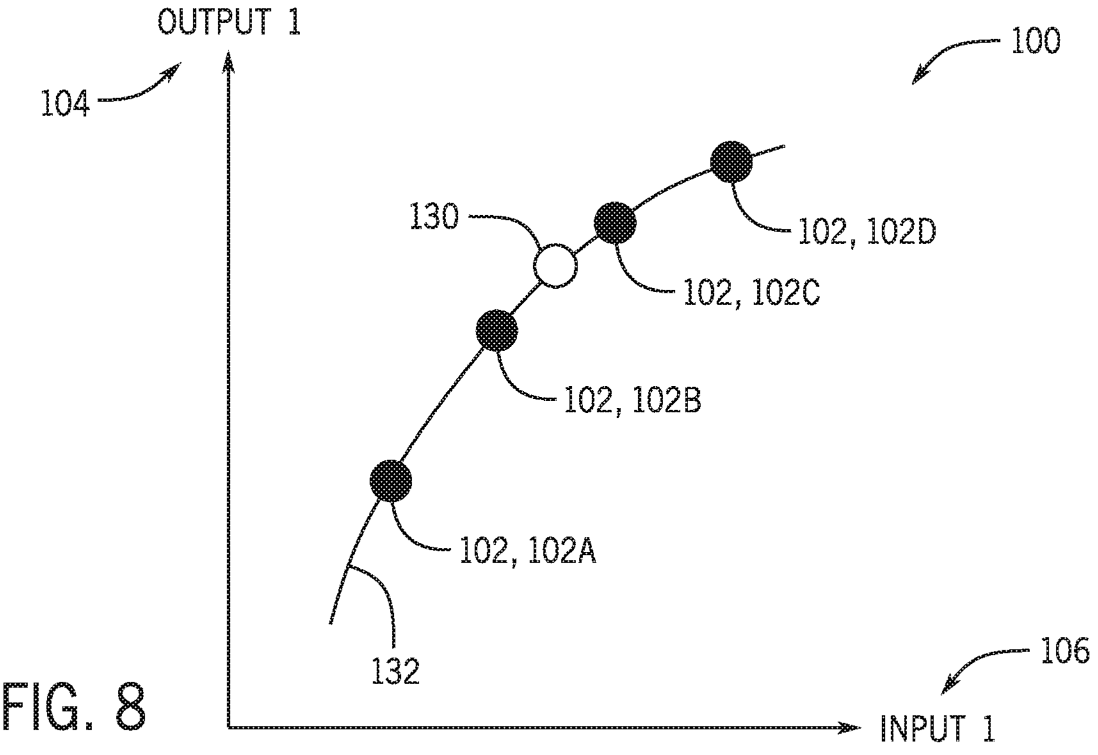
FIG. 8 is a schematic diagram of an embodiment of a one-dimensional LUT having various existing entries and an interpolated entry that may be referenced by the image data processing block of the display pipeline of FIG. 6 to process image data, in accordance with an embodiment of the present disclosure

FIG. 8 illustrates the LUT 100 having the existing entries 102 and an interpolated entry 130 that is not explicitly defined in the LUT 100. For example, an image data may include a value of the first input variable 106 that is not explicitly defined by any of the existing entries 102 of the LUT 100. Therefore, the LUT 100 does not explicitly define a corresponding value of the first output variable 104 for the value of the first input variable 106 of the image data. The interpolated entry 130 may represent such a value of the first input variable 106 of the image data, and the corresponding value of the first output variable 104 may be determined using curvature interpolation, which uses a mathematical relationship between the interpolated entry 130 and the existing entries 102 of the LUT 100.

By way of example, performing curvature interpolation may include using a relationship between the existing entries 102 (e.g., between the respective values of the first output variables 104 and respective values of the first input variables 106 of the existing entries 102) as well as using a relationship between the value of the first input variable 106 of the interpolated entry 130 relative to the respective values of the first input variable 106 of an immediately adjacent existing entry 102 to determine the corresponding value of the first output variable 104 of the interpolated entry 130. In some embodiments, the existing entries 102 may be defined in the LUT 100 such that a curve 132 (e.g., a regression curve, a fit curve) may represent a mathematical relationship between the existing entries 102 (e.g., by passing through a subset of the existing entries 102, by substantially passing through a subset of the existing entries 102 within a threshold value). The interpolated entry 130 may be located on the curve 132 (e.g., substantially located on the curve 132 within a threshold value).

In some embodiments of curvature interpolation, the value of the first output variable 104 of the interpolated entry 130 may be determined based on an equation that directly associates or equates the value of the first output variable 104 with the respective values of the first output variable 104 of the existing entries 102 (e.g., certain existing entries 102 adjacent to the interpolated entry 130), the step sizes between immediately adjacent existing entries 102, and/or a phase between the interpolated entry 130 and an existing entry 102 that is immediately adjacent to the interpolated entry 130. As used herein, the phase refers to the difference between the value of the first input variable 106 of the interpolated entry 130 and the value of the first input variable 106 of one of the entries 102 immediately adjacent to the interpolated entry 130. The illustrated example uses four existing entries 120 to determine the first output variable 104 of the interpolated entry 130. In particular, the interpolated entry 130 is positioned between the second existing entry 102B and the third existing entry 102C (e.g., the value of the first input variable 106 of the interpolated entry 130 is between the respective values of the first input variable 106 of the second existing entry 102B and of the third existing entry 102C). That is, the second existing entry 102B and the third existing entry 102C, which are each immediately adjacent to the interpolated entry 130, are used to determine the value of the first output variable 104 of the interpolated entry 130. Furthermore, the first existing entry 102A, which is immediately adjacent to the second existing entry 102B, and the fourth existing entry 102D, which is immediately adjacent to the third existing entry 102B, are also used to determine the value of the first output variable 104 of the interpolated entry 130.

Additionally or alternatively, a different set of existing entries 102 and/or a different number of existing entries 102 may be used to determine the value of the first output variable 104 of the interpolated entry 130. As an example, existing entries 102 that are not immediately adjacent to one another or immediately adjacent to the interpolated entry 130 may be used to determine the value of the first output variable 104 of the interpolated entry 130. As another example, three existing entries 102 may be used to determine the value of the first output variable 104 of the interpolated entry 130, such as for an interpolated entry in which there are only three existing entries 120 that are adjacent to the interpolated entry. Further still, two existing entries 102 or more than four existing entries 102 may be used in additional or alternative embodiments, such as based on a desirable accuracy of the first output value 104 of the interpolated entry 130.

The equation may be used to calculate the output value of the interpolated entry 130 by multiplying the above-referenced phase between two entries 102 (e.g., the entries immediately adjacent to the interpolated entry 130) with the quantity of a slope between the two entries 102 minus a curvature measurement of a set of entries 102 (i.e., a set of entries 102 that contains the two entries 102) as multiplied by the quantity of the step size between the two entries 102 minus the phase, then adding this calculation to the entry 102 having the lesser output value. The curvature measurement may generally relate the entries 102 with one another, such as by using a discretization technique (e.g., finite difference method) and factoring in a correction value.

In further embodiments of curvature interpolation, an equation of the curve 132 may be determined based on statistical regression analysis (e.g., of the respective values of the first input variable 106 and the respective values of the first output variable 104 associated with existing entries 102). The equation of the curve 132 may generally associate or equate a corresponding value of the first output variable 104 to any value of the first input variable 106. As such, the equation of the curve 132 may be applied to the value of the first input variable 106 of the interpolated entry 130 in order to determine the corresponding value of the first output variable 104 of the interpolated entry 130. In any case, the value of the first output variable 104 of the interpolated entry 130 determined via curvature interpolation may be applied to the image data (e.g., to a pixel of the image data represented by the interpolated entry 130) to transform the image data.

Figure 9:
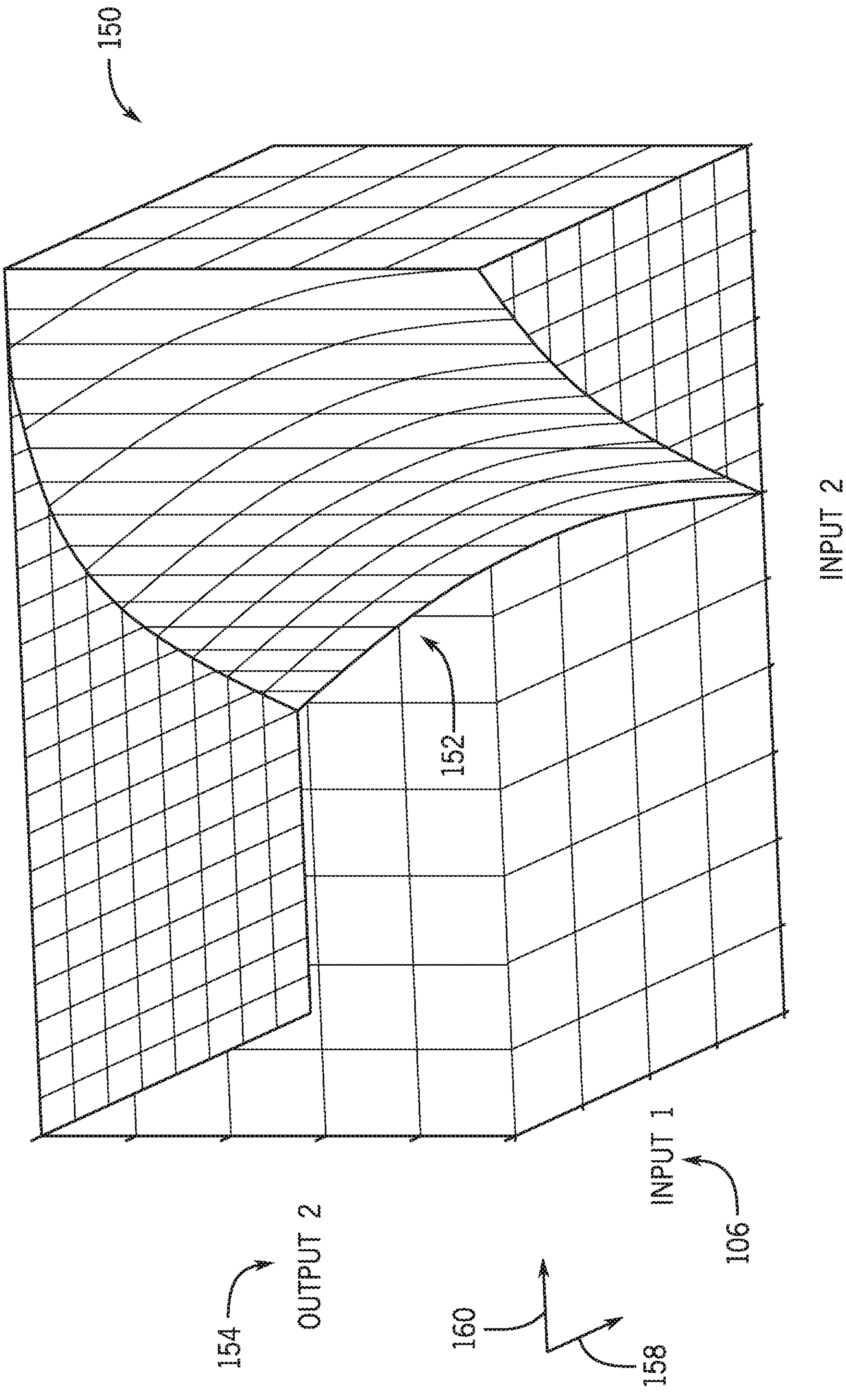
FIG. 9 is a schematic diagram of an embodiment of a two-dimensional LUT having various existing entries that may be referenced by the image data processing block of the display pipeline of FIG. 6 to process image data, in accordance with an embodiment of the present disclosure

FIG. 9 illustrates an embodiment of an LUT 150 (e.g., a two-dimensional LUT) having existing entries 152 that map a defined value of a second output variable 154 of each existing entry 152 to a pair of a defined value of the first input variable 106 and a value of a second input variable 156 (e.g., a defined input value set). That is, each coordinate point of the LUT 150 includes a value of the first input variable 106, a value of the second input variable 156, and a corresponding value of the second output variable 154. Thus, with respect to the first output variable 104 of the LUT 100, the second output variable 154 of the LUT 150 is further associated with an additional input variable of received image data.

Curvature interpolation may also be performed to determine an interpolated entry that is not explicitly defined by the LUT 150. By way of example, the values of the second output variable 154 for existing entries 152 that are adjacent to the interpolated entry (e.g., existing entries 152 immediately adjacent to the interpolated entry along a first axis 158 along which values of the first input variable 106 change and existing entries 152 immediately adjacent to the interpolated entry along a second axis 160 along which values of the second input variable 156 change) may be used to determine a value of the second output variable 154 of the interpolated entry. In some embodiments, the value of the second output variable 154 of the interpolated entry may be determined based on an equation that directly calculates the value of the second output variable 154 based on the respective values of the second output variable 154 of the existing entries 152 (e.g., certain existing entries 152 adjacent to the interpolated entry relative to the first axis 158 and/or relative the second axis 160), the step sizes between immediately adjacent existing entries 152, and/or the phase between the interpolated entry and one of the existing entries 152 that is immediately adjacent to the interpolated entry.

In additional or alternative embodiments, another equation (e.g., a regression equation), which may be based on statistical regression analysis of existing entries 152 adjacent to the interpolated entry, may be determined and may generally associate or equate corresponding values of the second output variable 154 with different sets of values of the first input variable 106 and of the second input variable 156. Thus, the equation may be applied to a particular set of the value of the first input variable 106 and the value of the second input variable 156 of the interpolated entry to determine the corresponding value of the second output variable 154 of the interpolated entry.

Figure 10:
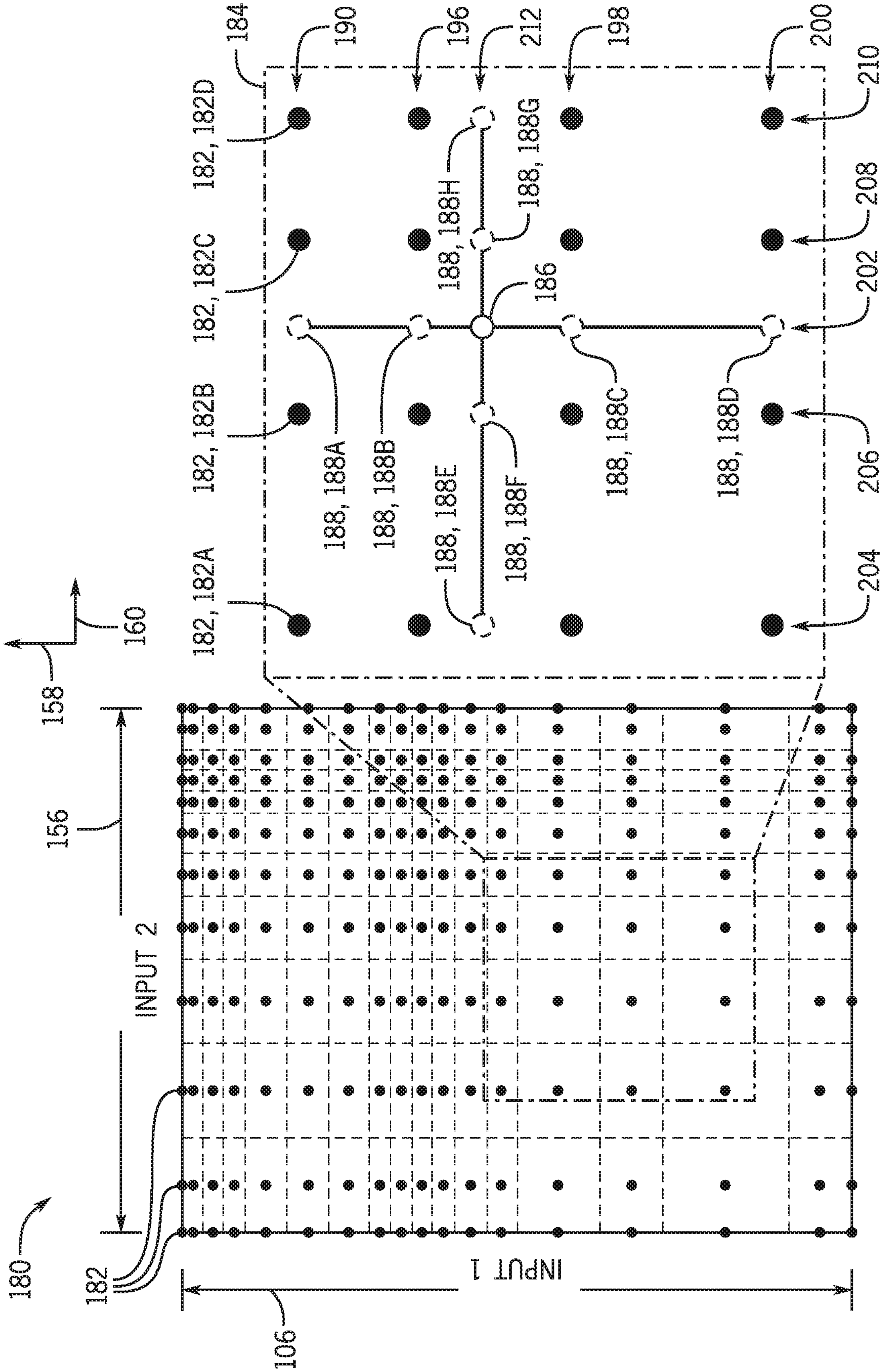
FIG. 10 is a schematic diagram of an embodiment of a two-dimensional LUT having various existing entries, virtual entries, and an interpolated entry that may be referenced by the image data processing block of the display pipeline of FIG. 6 to process image data, in accordance with an embodiment of the present disclosure.

FIG. 10 is a schematic diagram of an embodiment of a two-dimensional LUT 180 having existing entries 182. Each existing entry 182 maps or associates an output value (e.g., a value of the second output variable 154) with set containing a value of the first input variable 106 and a value of the second input variable 156 (e.g., an input value set). By way of example, each existing entry 182 may represent a position, location, or placement (e.g., of a pixel) on the electronic display 12. That is, the first input variable 106 may represent an input frame height of the electronic display 12, the second input variable 156 may represent an input frame width of the electronic display 12, and the output value may be a corresponding value that is based on the position on the electronic display 12. In the illustrated embodiment, the step sizes between immediately adjacent existing entries 182 (e.g., along the first axis 158 or along the second axis 160) are different, and the existing entries 182 are therefore unevenly spaced. In additional or alternative embodiments, the step sizes between immediately adjacent existing entries 182 may be the same, and the existing entries 182 are evenly spaced. In any case, the output values of the existing entries 182 may not be linearly related to one another. For this reason, curvature interpolation may be performed to accurately obtain output values for entries that are not explicitly defined by the LUT 180 (e.g., for interpolated pixels that are located between pixels represented by the existing entries 182).

An interpolation region 184 of the LUT 180 may include an interpolated entry 186 to be determined via curvature interpolation. That is, the interpolated entry 186 may represent an input value set received from the image data, and the input value set does not match that of any of the existing entries 182 of the LUT 180. The illustrated interpolation region 184 includes sixteen existing entries 182, which are positioned in a four-by-four square arrangement about the interpolated entry 186 and are used to determine the output value of the interpolated entry 186. That is, the sixteen existing entries 182 include respective, defined input value sets that are arranged about the input value set of the interpolated entry 186.

Performing curvature interpolation to determine the output value of the interpolated entry 186 may include determining various virtual entries 188 based on the existing entries 182. By way of example, a first row 190 of existing entries 182 (e.g., a first existing entry 182A, a second existing entry 182B, a third existing entry 182C, a fourth existing entry 182D) are arrayed along the second axis 160. That is, each existing entry 182 of the first row 190 may include the same value of the first input variable 106 but may include a different value of the second input variable 156. The techniques of curvature interpolation described with respect to FIG. 8 may be performed to determine an output value of a first virtual entry 188A that aligns with the first row 190 of existing entries 182 along the second axis 160 and that aligns with the interpolated entry 186 along the first axis 158. In other words, the value of the first input variable 106 of the first virtual entry 188A is equal to that of the first row 190 of existing entries 182, and the value of the second input variable 156 of the first virtual entry 188A is equal to that of the interpolated entry 186 Indeed, the output value of the first virtual entry 188A may be determined based on the respective output values of the existing entries 182 of the first row 190, the respective step sizes between the immediately adjacent existing entries 182 of the first row 190, and/or the phase between the first virtual entry 188A and one of the existing entries 182 of the first row 190 immediately adjacent to the first virtual entry 188A.

Similarly, curvature interpolation may be performed to determine each of a second virtual entry 188B based on existing entries 182 arrayed along a second row 196, a third virtual entry 188C based on existing entries 182 arrayed along a third row 198, and/or a fourth virtual entry 188D based on existing entries 182 arrayed along a fourth row 200. Each of the first virtual entry 188A, the second virtual entry 188B, the third virtual entry 188C, and the fourth virtual entry 188D may also align with the interpolated entry 186 along the first axis 158, such as along a first column 202. Curvature interpolation may then be performed using the first virtual entry 188A, the second virtual entry 188B, the third virtual entry 188C, and/or the fourth virtual entry 188D to determine the output value of the interpolated entry 186. That is, the output value of the interpolated entry 186 may be determined based on the respective output values of the virtual entries 188 of the first column 202, the respective step sizes between the immediately adjacent virtual entries 188 of the first column 202, and/or the phase between the interpolated entry 186 and one of the virtual entries 188 of the first column 202 immediately adjacent to the interpolated entry 186.

In this manner, curvature interpolation is initially performed on each of the illustrated rows 190, 196, 198, 200 of existing entries 182 to determine respective virtual entries 188 that are arrayed along the first column 202 that aligns with the interpolated entry 186. A subsequent curvature interpolation is then performed on the first column 202 of determined virtual entries 188 to determine the output value of the interpolated entry 186. This described sequence of performing curvature interpolations to determine the output value of the interpolated entry 186 may be considered a row-column based curvature interpolation method.

Additionally or alternatively, curvature interpolations may be performed on columns of existing entries 182 to determine respective virtual entries 188 that align with the interpolated entry 186 along the second axis 160, and a subsequent curvature interpolation may be performed on the determined virtual entries 188 to determine the output value of the interpolated entry 186. That is, curvature interpolation may be performed to determine each of a fifth virtual entry 188E based on existing entries 182 arrayed along a second column 204, a sixth virtual entry 188F based on existing entries 182 arrayed along a third column 206, a seventh virtual entry 188G based on existing entries 182 arrayed along a fourth column 208, and an eighth virtual entry 188H based on existing entries 182 arrayed along a fifth column 210. Each of the fifth virtual entry 188E, the sixth virtual entry 188F, the seventh virtual entry 188G, and the eighth virtual entry 188H align with one another and with the interpolated entry 186 along the second axis 160, such as along a fifth row 212. Curvature interpolation may then be performed using the fifth virtual entry 188E, the sixth virtual entry 188F, the seventh virtual entry 188G, and/or the eighth virtual entry 188H to determine the output value of the interpolated entry 186. This sequence of performing curvature interpolations may be considered a column-row based curvature interpolation method.

In some embodiments, the output value of the interpolated entry 186 determined based on row-column curvature interpolation may be equal to or substantially equal to (e.g., within a threshold value) the output value of the interpolated entry 186 determined based on column-row curvature interpolation. For this reason, in certain embodiments, only one of row-column curvature interpolation or column-row curvature interpolation may be performed. In additional or alternative embodiments, both row-column curvature interpolation and column-row curvature interpolation may be performed. For example, performing row-column curvature interpolation may result in determining a first output value (e.g., an estimate or approximation of the actual output value of the interpolated entry 186), and performing column-row curvature interpolation may result in determining a second output value (e.g., another estimate or approximation of the actual output value of the interpolated entry 186) that is different from the first output value. In such embodiments, the different output values of the interpolated entry 186 may be used to obtain a final output value of the interpolated entry 186, such as based on a mathematical mean of the different, determined output values of the interpolated entry 186. In this way, the final output value of the interpolated entry 186 may more accurately reflect the actual output value of the interpolated entry 186. In any case, the output value of the interpolated entry 186, as determined based on one or more performances of curvature interpolation, may be applied to the input value set of the received image data represented by the interpolated entry 186 to transform the received image data.

Although the illustrated example uses sixteen existing entries 182 to determine the various virtual entries 188 and the output value of the interpolated entry 186, any suitable number of existing entries 182 may be used. As an example, nine existing entries 182 (e.g., positioned in a three-by-three square arrangement about the interpolated entry 186) may be used, twenty five existing entries 182 (e.g., positioned in a five-by-five arrangement about the interpolated entry 186) may be used, four existing entries 182 (e.g. positioned in a two-by-two arrangement about the interpolated entry 186) may be used, between nine and twenty five existing entries 182 may be used, or greater than twenty five existing entries 182 may be used, and so forth. Thus, initial curvature interpolations may be performed on any suitable number (e.g., three, four, five) of rows or columns of the existing entries 182 to determine a corresponding number of virtual entries 188. Alternatively, curvature interpolation may be performed using an arrangement of existing entries 182 that includes a different number of existing entries 182 in a row as that in a column (e.g., an arrangement that is not a square) about the interpolated entry 186, such a three-by-four rectangular arrangement about the interpolated entry 186, an arrangement about the interpolated entry 186 in which the number of existing entries 182 in each row alternates between three and four, and the like. Indeed, any suitable number of existing entries 182 may be used to determine the output value of the interpolated entry 186.

Further, although each of FIGS. 7 and 8 illustrates a one-dimensional LUT and each of FIGS. 9 and 10 illustrates a two-dimensional LUT, it should be noted that curvature interpolation may be performed with respect to an LUT of any dimension, such as a three-dimensional LUT, a four-dimensional LUT, and so forth. Indeed, the techniques described herein related to determining virtual entries and/or interpolated entries may use existing entries of any suitably sized LUT.

Figure 11:
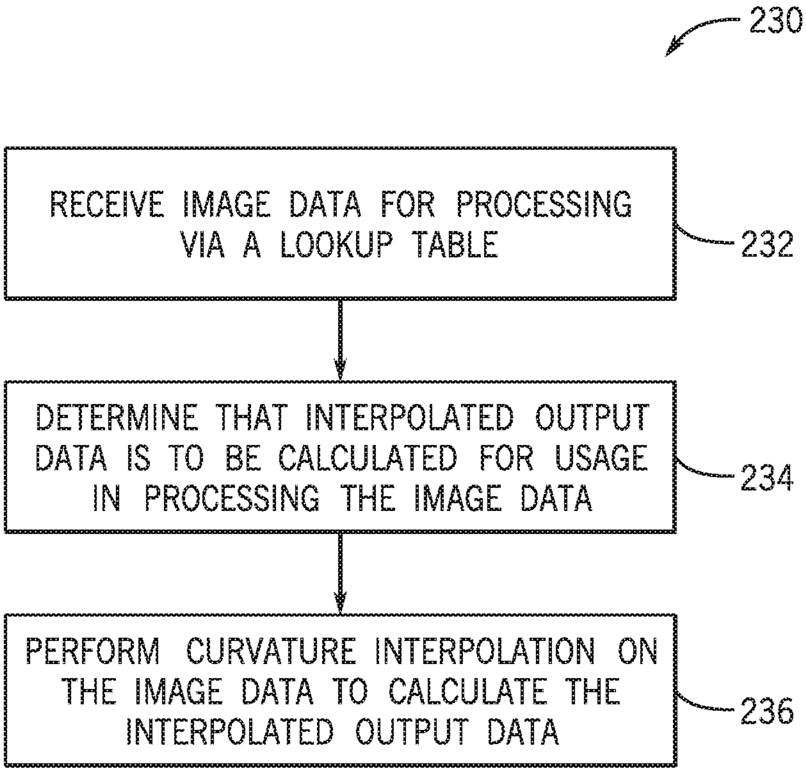
FIG. 11 is a flow diagram of a method or process for processing image data received by the image data processing block of the display pipeline of FIG. 6, in accordance with an embodiment of the present disclosure.

FIG. 11 illustrates a flowchart of a method or process 230 for determining an interpolated output value of an LUT (e.g., the LUT 100, the LUT 150) with respect to the techniques described herein. The method 230 may be facilitated (e.g., controlled, implemented) by instructions stored in a tangible, non-transitory, computer-readable medium, such as the external memory 40 or other memory, using a controller of the processor core complex 18, such as a display pipeline controller of the display pipeline 38. For example, the image data processing block(s) 46 may perform at least some of the steps of the method 230. It should be noted that the method 230 may be performed differently in different embodiments. As an example, additional steps may be performed, and/or certain steps of the depicted method 230 may be removed, modified, and/or performed in a different order. It should be noted that although the method 230 is described as being performed by the image data processing block(s) 46 (e.g., control circuitry of the image data processing block[s] 46), the method 230 may be performed by any suitable component. Indeed, different components may perform different steps depicted in the method 230.

At block 232, the image data processing block(s) 46 may receive image data from the external memory 40 for processing via an LUT (e.g., the LUT 100, the LUT 150, the LUT 180). The image data may include various input data (e.g., multiple input value sets), such as data associated with a color space. The image data processing block(s) 46 may use the LUT to determine corresponding output data based on the input data, such as based on an input value set of the image data. For instance, the image data processing block(s) 46 may determine that input data (e.g., an input value set) of the image data matches with defined input data (e.g., a defined input value set) of the LUT, such as input data defined by existing entries of the LUT. The image data processing block(s) 46 may then identify the corresponding output data associated with the matched input data of the LUT for use with respect to such input data of the image data.

At block 234, the image data processing block(s) 46 determines that interpolated output data is to be calculated or derived to process the image data. For example, the image data processing block(s) 46 may determine that certain input data of the image data does not match with any existing input data defined by the LUT. Thus, the image data processing block(s) 46 is not able to readily identify corresponding output data defined by the LUT.

As a result, at block 236, the image data processing block(s) 46 (e.g., the curvature interpolation block 72) may perform curvature interpolation to calculate the interpolated output data, such as of an interpolated entry representing input data not defined by the LUT. In some embodiments, curvature interpolation may initially be performed to determine output values of virtual entries of the LUT, such as virtual entries that have a same common input value with that of the interpolated entry. After determining the output values of the virtual entries, curvature interpolation may subsequently be performed to determine the output value of the interpolated entry. In any case, as discussed above, curvature interpolation may be performed using input values and output values of known entries (e.g., existing entries, virtual entries) that are adjacent to the interpolated entry.

As an example, curvature interpolation may include using an equation that directly associates or equates the output value of the interpolated entry based on output values of the known entries, step sizes between the known entries, and/or the position of the interpolated entry relative to one of the known entries (e.g., the phase of the interpolated entry). As another example, a regression equation, which may be determined based on the known entries and which generally associates or equates corresponding output values to input values, may be applied to the input data (e.g., the input value set) of the interpolated entry to determine the output value of the interpolated entry. In any case, the output value that is calculated using curvature interpolation may be used for processing the image data.

Thus, the technical effects of the present disclosure include using an LUT and performing curvature interpolation on entries of the LUT to process image data in order to improve image presentation on a display. As an example, curvature interpolation may be performed to accurately determine an output value to be applied to image data to improve the transformation (e.g., correction) of an image, such as to improve a quality of the image. For example, performing curvature interpolation may include using the output values of existing entries of the LUT in order to determine an output value of an interpolated entry that is not explicitly defined by the LUT. In some embodiments, curvature interpolation may include an equation that directly calculates an output value of the interpolated entry based on output values of known entries of the LUT, step sizes between known entries, and/or the position of the interpolated entry relative to the known entries. In additional or alternative embodiments, curvature interpolation may include an equation that generally associates or equates corresponding output values with various input values. In any case, the output values of various entries of the LUT may have a non-linear relationship with one another. Thus, the output value determined via curvature interpolation may more accurately represent the actual output value of the interpolated entry than an output value that is not determined via curvature interpolation, such as an output value of an existing entry (e.g., of an existing entry immediately adjacent to the interpolated entry) and/or an output value calculated using a linear interpolation method.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:

an electronic display configured to present an image based at least in part on image data; and a display pipeline comprising image processing circuitry configured to process the image data for display on the electronic display at least in part by:

receiving the image data;

referencing a lookup table (LUT) to determine a plurality of output values based at least in part on a plurality of input value sets associated with the image data, wherein the LUT comprises a plurality of entries that respectively map a respective output value to a defined input value set;

determining whether an input value set of the plurality of input value sets of the image data is represented by the plurality of entries of the LUT;

in response to determining the input value set of the plurality of input value sets of the image data is not represented by the plurality of entries of the LUT, performing curvature interpolation to determine an interpolated output value associated with the input value set; and applying the interpolated output value to the image data associated with the input value set to generate updated image data.

2. The electronic device of claim 1, wherein the image processing circuitry is configured to perform curvature interpolation to determine the interpolated output value based at least in part on respective output values of a subset of the plurality of entries.

3. The electronic device of claim 2, wherein the input value set is represented by an interpolated entry, and the interpolated entry is disposed between the subset of the plurality of entries in the LUT.

4. The electronic device of claim 2, wherein the subset of the plurality of entries comprises nine to twenty five entries.

5. The electronic device of claim 1, wherein the respective output values of the plurality of entries have a non-linear relationship with one another.

6. The electronic device of claim 1, wherein the plurality of output values of the LUT comprises a color adjustment value, a geometry adjustment value, a scaling value, or any combination thereof.

7. The electronic device of claim 1, wherein the image processing circuitry is configured to process the image data for display on the electronic display at least in part by:

determining an additional input value set of the plurality of input value sets of the image data is represented by an entry of the plurality of entries;

identifying an output value associated with the entry; and applying the output value to the image data associated with the additional input value set of the plurality of input value sets of the image data to generate the updated image data.

8. A display pipeline configured to process image data for display on an electronic display, wherein the display pipeline comprises:

a lookup table (LUT) comprising a plurality of entries that respectively map a respective output value to a defined input value set; and processing circuitry configured to process the image data at least in part by:

receiving the image data;

referencing the LUT to determine a plurality of output values based at least in part on a plurality of input value sets associated with the image data;

in response to determining an input value set of the plurality of input value sets of the image data is not represented by the plurality of entries of the LUT, performing curvature interpolation to determine an interpolated output value associated with the input value set; and applying the interpolated output value to the image data associated with the input value set to generate updated image data.

9. The display pipeline of claim 8, wherein the processing circuitry is configured to perform row-column curvature interpolation, column-row curvature interpolation, or both, to determine the interpolated output value.

10. The display pipeline of claim 8, wherein the display pipeline is configured to perform curvature interpolation to determine the interpolated output value based at least in part on respective output values of a subset of the plurality of entries.

11. The display pipeline of claim 10, wherein the subset of the plurality of entries comprises a plurality of defined input value sets comprising input values corresponding to a first dimension and a second dimension in the LUT.

12. The display pipeline of claim 10, wherein the subset of the plurality of entries comprises defined input value sets that are immediately adjacent to the input value set.

13. The display pipeline of claim 8, wherein the LUT is a one-dimensional LUT or a two-dimensional LUT.

14. A non-transitory, computer-readable medium comprising instructions that, when executed by processing circuitry, are configured to cause the processing circuitry to process image data at least in part by:

receiving the image data;

referencing a lookup table (LUT) to determine a plurality of output values based at least in part on a plurality of input value sets associated with the image data, wherein the LUT comprises a plurality of entries that respectively map a respective output value to a defined input value set;

in response to determining an input value set of the plurality of input value sets of the image data is not represented by the plurality of entries of the LUT, performing curvature interpolation to determine an interpolated output value associated with an interpolated entry representing the input value set; and applying the interpolated output value to the image data associated with the input value set to generate updated image data.

15. The non-transitory, computer-readable medium of claim 14, wherein performing curvature interpolation comprises applying an equation that directly associates a corresponding interpolated output value with respective output values of a subset of the plurality of entries, step sizes between entries of the subset of the plurality of entries, and a phase between the interpolated entry and an entry of the subset of the plurality of entries.

16. The non-transitory, computer-readable medium of claim 14, wherein performing curvature interpolation comprises determining a regression equation based at least in part on respective output values of a subset of the plurality of entries, the regression equation associates corresponding output values with input value sets, and performing curvature interpolation comprises applying the regression equation to the input value set associated with the interpolated entry to determine the interpolated output value.

17. The non-transitory, computer-readable medium of claim 14, wherein performing curvature interpolation comprises performing first curvature interpolations on a subset of the plurality of entries to determine a set of virtual entries and performing a second curvature interpolation on the set of virtual entries to determine the interpolated output value.

18. The non-transitory, computer-readable medium of claim 17, wherein each of the virtual entries of the set of virtual entries and the interpolated entry shares a common input value.

19. The non-transitory, computer-readable medium of claim 17, wherein performing the first curvature interpolations comprises performing respective curvature interpolations on a plurality of rows of the plurality of entries, performing respective curvature interpolations on a plurality of columns of the plurality of entries, or both.

20. The non-transitory, computer-readable medium of claim 19, wherein the plurality of rows comprises three rows of entries or four rows of entries, and the plurality of columns comprises three columns of entries or four columns of entries.

21. A non-transitory, computer-readable medium comprising instructions that, when executed by processing circuitry, are configured to cause the processing circuitry to process data at least in part by:

referencing a lookup table (LUT) to determine a plurality of output values based at least in part on a plurality of input value sets associated with the data, wherein the LUT comprises a plurality of entries that respectively map a respective output value to a defined input value set;

in response to determining an input value set of the plurality of input value sets of the data is not represented by the plurality of entries of the LUT, performing curvature interpolation to determine an interpolated output value associated with an interpolated entry representing the input value set; and applying the interpolated output value to the data associated with the input value set to generate updated data.

22. The non-transitory, computer-readable medium of claim 21, wherein the instructions, when executed by the processing circuitry, are configured to cause the processing circuitry to perform multiple iterations of curvature interpolation to determine the interpolated output value.

23. The non-transitory, computer-readable medium of claim 21, wherein the LUT is a multi-dimensional LUT.

24. The non-transitory, computer-readable medium of claim 21, wherein the instructions, when executed by the processing circuitry, are configured to cause the processing circuitry to perform curvature interpolation to determine the interpolated output value based at least in part on respective output values of a subset of the plurality of entries, and the subset of the plurality of entries comprises a plurality of defined input value sets, and a defined input value set of the plurality of defined input value sets comprises a first input value corresponding to a first dimension in the LUT and a second input value corresponding to a second dimension in the LUT, wherein a first difference between the first input value and a corresponding third input value of the input value set is different than a second difference between the second input value and a corresponding fourth input value of the input value set.

25. The non-transitory, computer-readable medium of claim 21, wherein the plurality of entries of the LUT comprises information associated with pixels of image data.

* * * * *